United States Patent
Shyu et al.

(10) Patent No.: US 6,733,157 B1
(45) Date of Patent: May 11, 2004

(54) RADIATING APPARATUS FOR U-SHAPE PROJECTOR SYSTEM

(75) Inventors: Fang-Yuan Shyu, Hsin Chu (TW); Yin-Fa Tu, Taipei (TW)

(73) Assignee: Lité-on Technology Corp., Taipei (TW)

( * ) Notice: Subject to any disclaimer, the term of this patent is extended or adjusted under 35 U.S.C. 154(b) by 0 days.

(21) Appl. No.: 10/298,925

(22) Filed: Nov. 19, 2002

(51) Int. Cl.[7] .............................................. F21V 29/00
(52) U.S. Cl. ........................ 362/294; 362/373; 353/57; 353/61
(58) Field of Search ................................ 362/294, 373, 362/264; 353/57, 58, 61

(56) References Cited

U.S. PATENT DOCUMENTS

| | | | |
|---|---|---|---|
| 6,422,730 B1 * | 7/2002 | Koren et al. | 362/580 |
| 6,575,599 B1 * | 6/2003 | Imamura et al. | 362/294 |
| 6,582,082 B2 * | 6/2003 | Tiao et al. | 353/57 |

* cited by examiner

*Primary Examiner*—Thomas M. Sember
(74) *Attorney, Agent, or Firm*—Birch, Stewart, Kolasch & Birch, LLP

(57) ABSTRACT

A radiating apparatus for U-shape projector system includes a ventiduct structure with a ventiduct space, an air input end-and an air output end arranged at two ends of the ventiduct structure, and a projecting tens arranged outside the ventiduct structure. A light source has a lamp center and is arranged in the ventiduct space. A lamp radiating fan inhales an air to flow toward the lamp center of the lamp, and a radiating fan drain the air out of the ventiduct space.

3 Claims, 3 Drawing Sheets

RADIATING APPARATUS FOR U-SHAPE PROJECTOR SYSTEM

FIELD OF THE INVENTION

The present invention relates to a radiating apparatus for U-shape projector system, especially to a radiating apparatus for U-shape projector system, which has special ventiduct structure and having a lamp radiating fan and a radiating fan for driving an air flow along a congruent direction.

BACKGROUND OF THE INVENTION

Projector devices have rapid progress as the advance of optical and projection technologies. More particularly, the sizes and cost of the projector devices are reduced such that the projector devices are extensively used for presentation, meeting, educational training or even home entertainment. The development trends of the projector devices are high image quality, high brightness, compact size, and low price.

However, to achieve high brightness, the projector devices should adopt light source with higher power. Therefore, the projector devices requires larger radiating fan with serious noise and bulk radiating system.

Taking a U-shape projector system as an example, in such system, a light source is very close to a projecting lens and it places serious limitation to the arrangement of the radiating apparatus. For example, it is hard to manipulate a cooling air flowing toward the projecting lens such that a mirage phenomenon is likely to occur. More particularly, it is hard to arrange a radiating fan and a lamp radiating fan for the projecting lens. In conventional U-shape projector system, it is hard to provide an axial fan due to limited space between the projecting lens and light source. Therefore, only an axial fan is placed on the side of the light source opposite to the projecting lens to drain the cooling air. To provide better effect, a radial fan is provided and arranged at the same side of the axial fan. As a result, the relative hot air is driven toward the projecting lens or has the risk of flowing back toward the lamp. The hot air will cause mirage phenomenon or even degrade the radiating effect around the lamp. To overcome this problem, the volume of the conventional radiating systems is inevitably bulky.

SUMMARY OF THE INVENTION

It is an object of the present invention to provide a radiating apparatus for U-shape projector system, which has improved ventiduct structure to advantageously guide an air flow for heat dissipation.

It is another object of the present invention to provide a radiating apparatus for U-shape projector system, wherein a lamp radiating fan and a radiating fan are such arranged to drive an air flow along a congruent direction.

To achieve above object, the present invention provides a radiating apparatus for U-shape projector system comprising a ventiduct structure with a ventiduct space, an air input end and an air output end arranged at two ends of the ventiduct structure, and a projecting lens arranged outside the ventiduct structure. A light source has a lamp center and is arranged in the ventiduct space. A lamp radiating fan is arranged at a position offset to a projecting lens, i.e., a location below a center axis of the projecting lens. A radiating fan is provided at the inner side of the of the air output end of the ventiduct structure. The lamp radiating fan inhales an air and drive the air to flow from the projecting lens to the lamp center of the lamp. The radiating fan drains the air out of the ventiduct space to rapidly remove heat from the lamp.

The various objects and advantages of the present invention will be more readily understood from the following detailed description when read in conjunction with the appended drawing, in which:

DETAILED DESCRIPTION OF THE INVENTION

Figure 1:
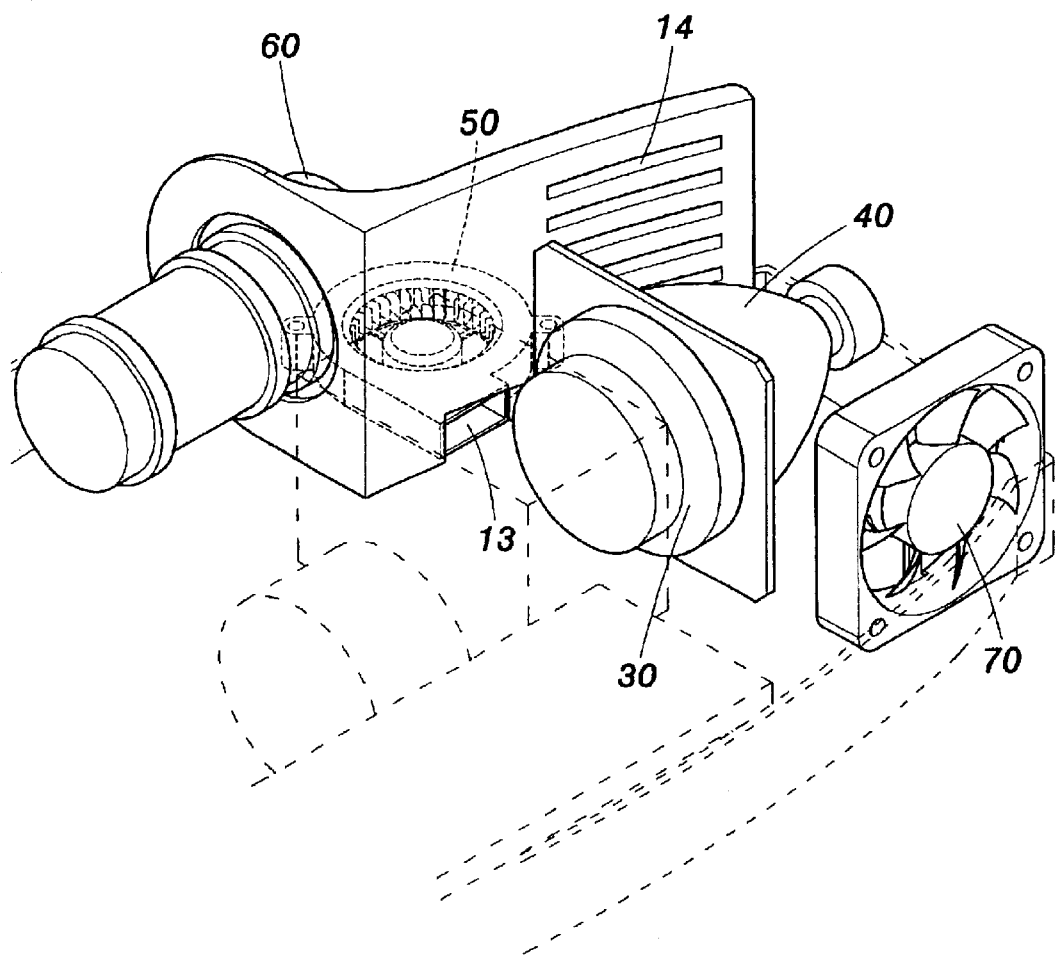
FIG. 1 shows a perspective view of a radiating apparatus for U-shape projector system according to the present invention.
Figure 2:
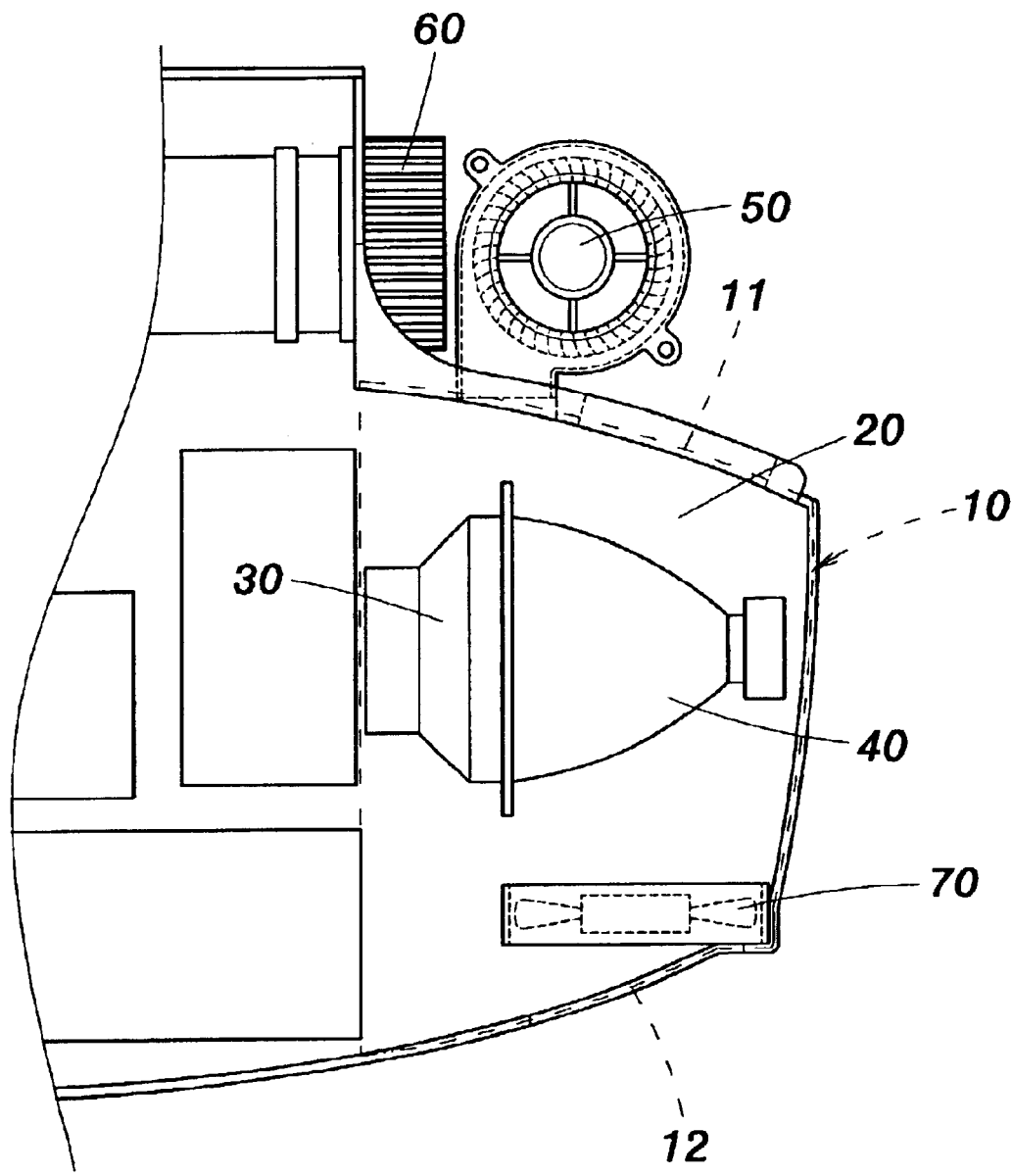
FIG. 2 shows a top view of a radiating apparatus for U-shape projector system according to the present invention.

With reference now to FIGS. 1 and 2, the present invention provides a radiating apparatus for U-shape projector system. The radiating apparatus comprises a ventiduct structure 10 with a ventiduct space 20, an air input end 11 and an air output end 12 arranged at two ends of the ventiduct structure 10, respectively. A projecting lens 60 is arranged outside the ventiduct structure 10. An air inlet 13 is provided at the air input end 11 of the ventiduct structure 10, a plurality of transversal openings 14 is provided near the air input end 11 of the ventiduct structure 10. A light source (such as a lamp 40) having a lamp center 30 is arranged in the ventiduct space 20 of the ventiduct structure 10. A lamp radiating fan 50 is provided at an outside of the air input end 11 of the ventiduct structure 10 and below the projecting lens 60. A radiating fan 70 is provided at an inner side of the of the s air output end 12 of the ventiduct structure 10.

Figure 3:
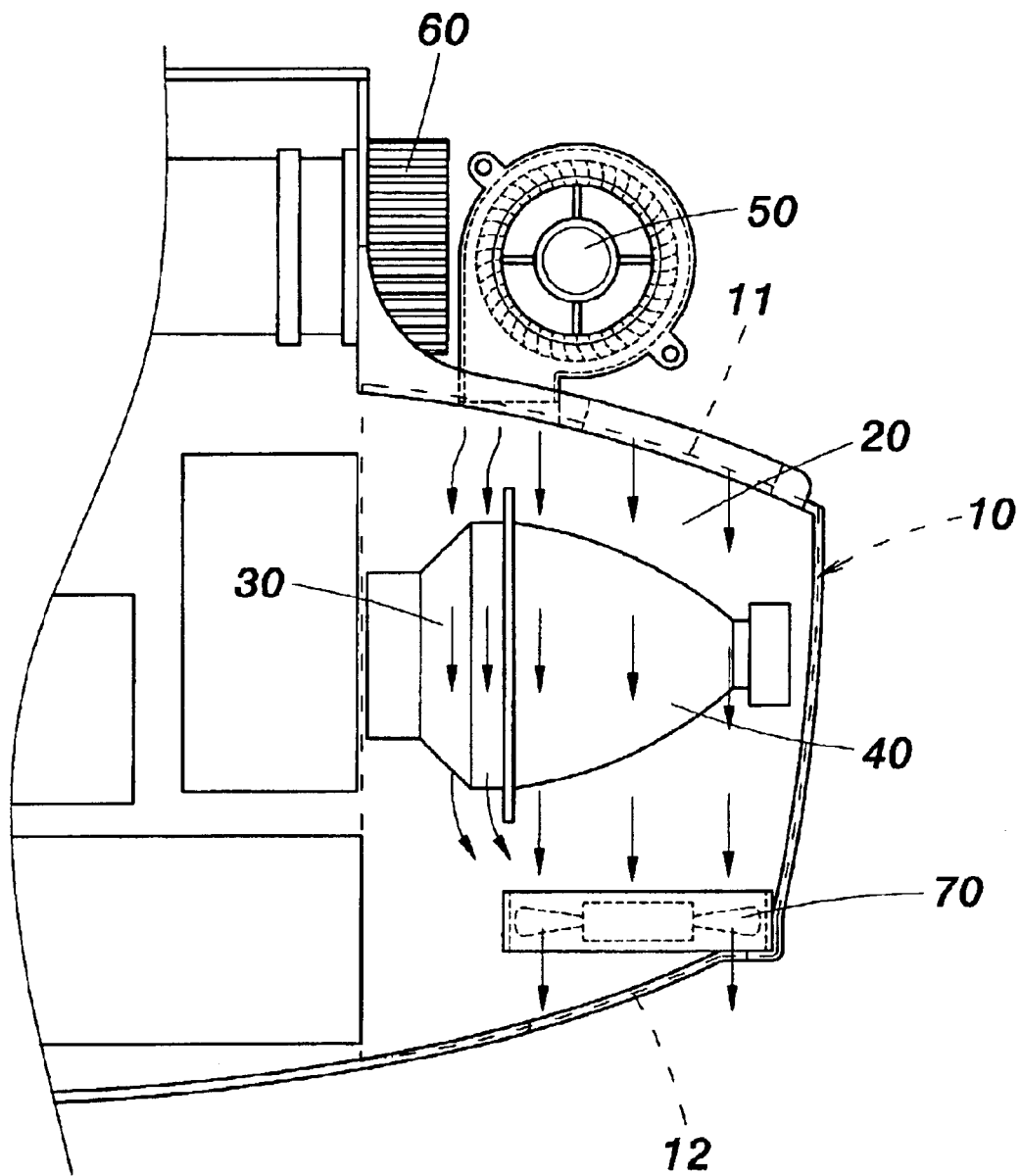
FIG. 3 shows a top view of the radiating apparatus according to the present invention, wherein an air flowing direction is depicted.

FIG. 3 shows a top view of the radiating apparatus according to the present invention, wherein an air flowing direction is depicted. The lamp radiating fan 50 is provided at the outside of the air input end 11 of the ventiduct structure 10 and below or in front of the projecting lens 60. The lamp radiating fan 50 inhales an air to flow toward the lamp center 30 of the lamp 40. The radiating fan 70 is provided at the inner side of the of the air output end 12 of the ventiduct structure 10 and drain an air into the ventiduct space 20 through the transversal openings 14 near the air input end 11 of the ventiduct structure 10 and to drain the air out of the ventiduct space 20 through the air output end 12 of the ventiduct structure 10.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A heat-dissipating device adapted for a U-shape projector system having a light-source lamp and a projecting lens parallel and adjacent to the light-source lamp, comprising:

a ventiduct structure having an air input end and an air output end arranged at two ends thereof, and a ventiduct space formed between the air input end and the air output end;

wherein the projecting lens is positioned outside of the air input end of the ventiduct structure;

wherein the light-source lamp is positioned in the ventiduct space of the ventiduct structure;

a lamp radiating fan positioned at an outside of the air input end of the ventiduct structure and below the projecting lens; and a radiating fan positioned inside of the air output end of the ventiduct structure;

wherein the lamp radiating fan inhales an air flow through the air input end to blow toward a lamp center of the light-source lamp, and the radiating fan discharges the air flow through the air output end to cool the light-source lamp.

2. The radiating apparatus for U-shape projector system as in claim 1, wherein an air inlet is provided at the air input end of the ventiduct structure, and a plurality of transversal openings are provided near the air input end of the ventiduct structure.

3. The radiating apparatus for U-shape projector system as in claim 1, wherein the light source is a lamp.

* * * * *